April 11, 1961    E. P. POLLITT    2,978,918
TRANSMISSION
Filed July 25, 1958    11 Sheets-Sheet 1

Inventor:
Erwin P. Pollitt

April 11, 1961 E. P. POLLITT 2,978,918
TRANSMISSION
Filed July 25, 1958 11 Sheets-Sheet 2

Inventor
Erwin P. Pollitt

April 11, 1961 E. P. POLLITT 2,978,918
TRANSMISSION
Filed July 25, 1958 11 Sheets-Sheet 5
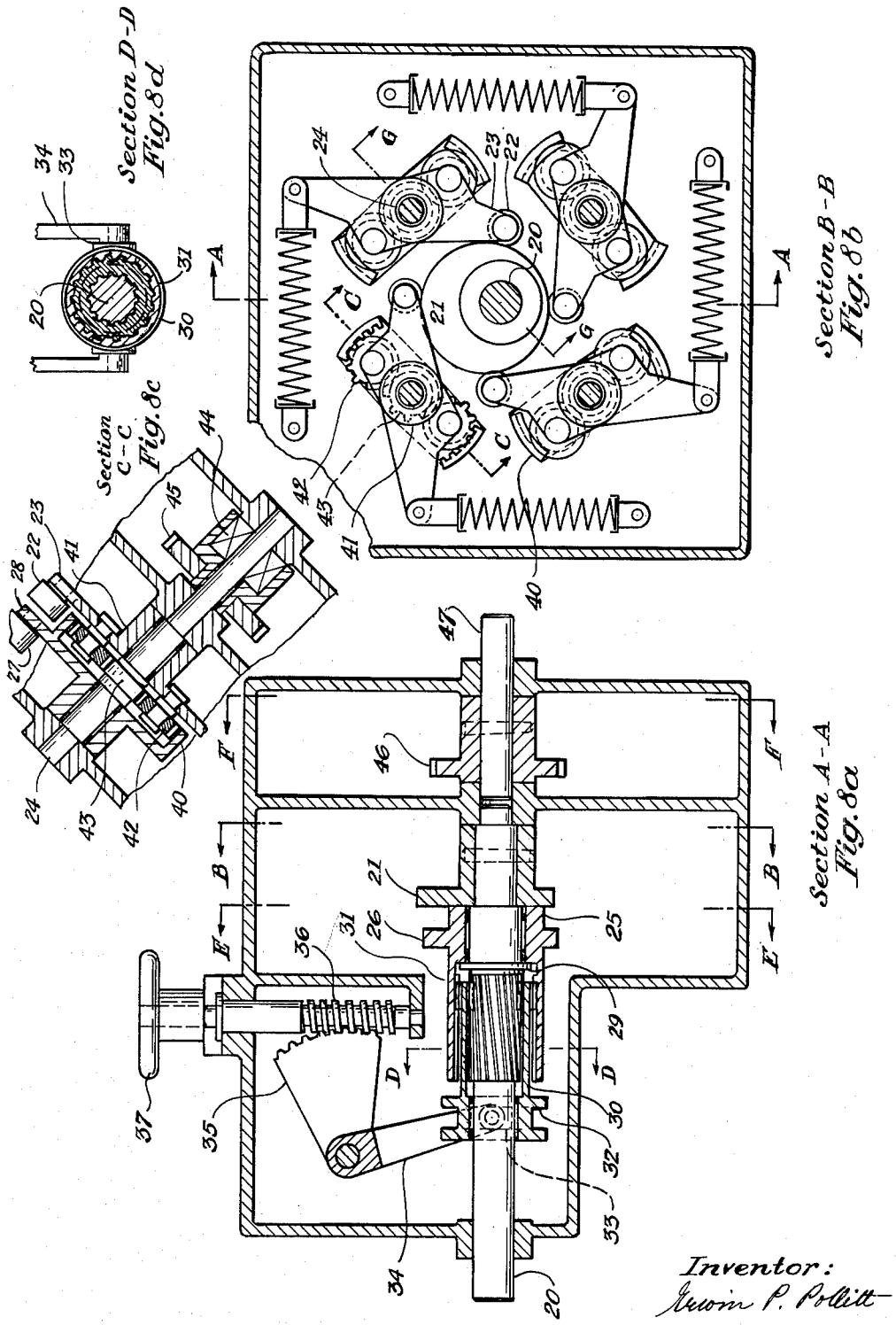
Inventor:
Erwin P. Pollitt April 11, 1961 E. P. POLLITT 2,978,918
TRANSMISSION
Filed July 25, 1958 11 Sheets-Sheet 6

Section F-F

Section E-E

Inventor
Erwin P. Pollitt

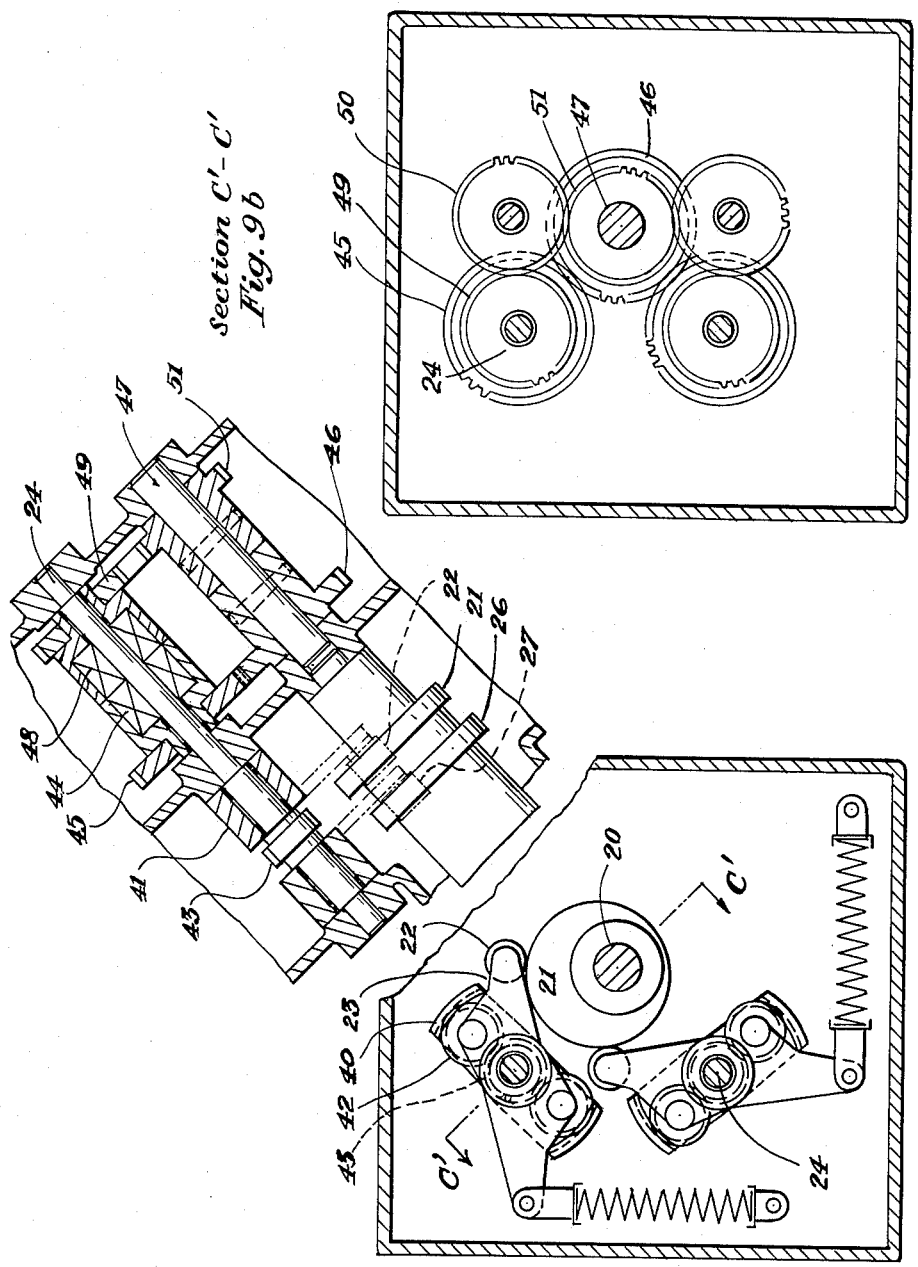

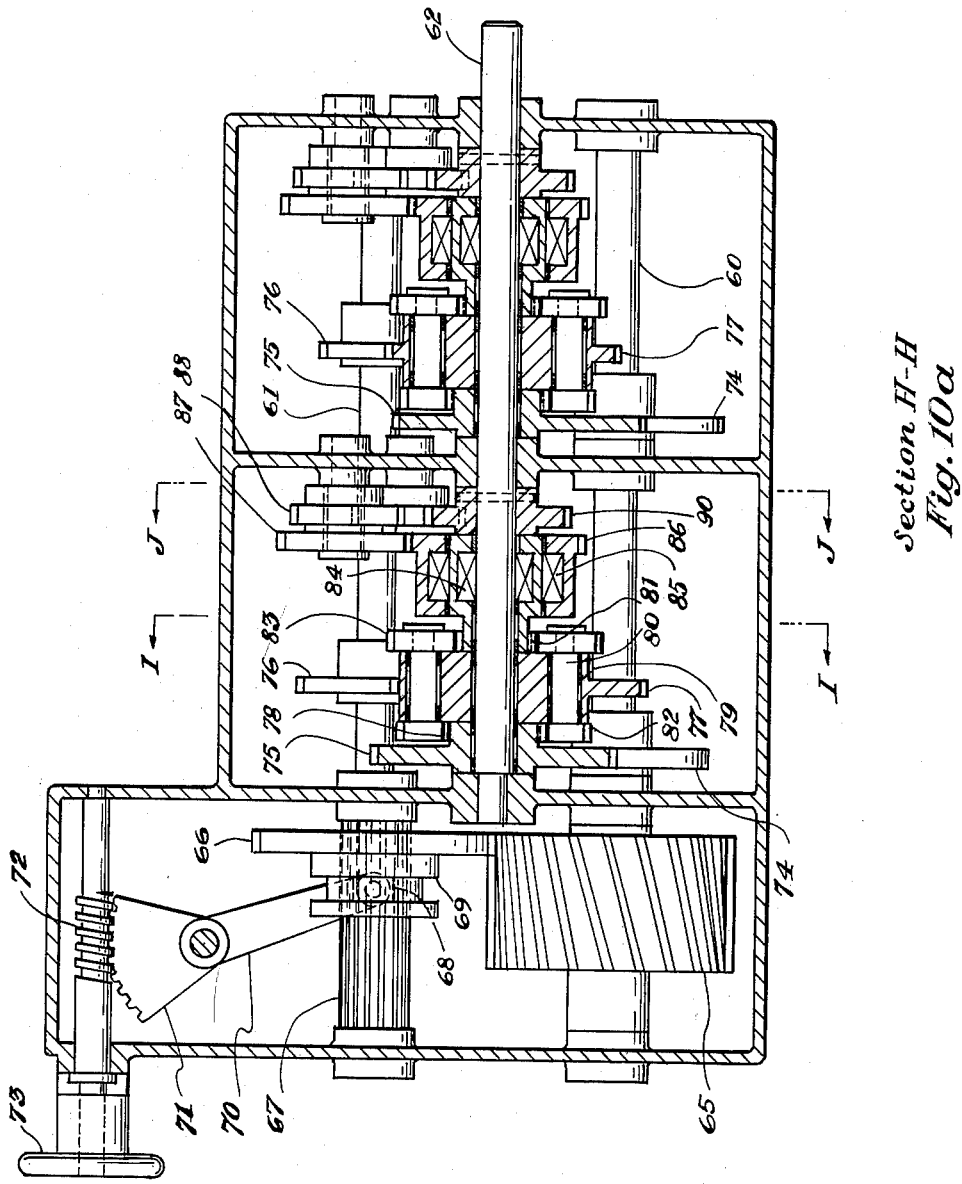

April 11, 1961   E. P. POLLITT   2,978,918
TRANSMISSION

Filed July 25, 1958   11 Sheets-Sheet 9

Section I-I

Section J-J

Inventor
Irwin P. Pollitt

April 11, 1961 E. P. POLLITT 2,978,918
TRANSMISSION
Filed July 25, 1958 11 Sheets-Sheet 10

Section G-G

Section L-L

Section K-K

Inventor
Erwin P. Pollitt

April 11, 1961  E. P. POLLITT  2,978,918
TRANSMISSION
Filed July 25, 1958  11 Sheets-Sheet 11
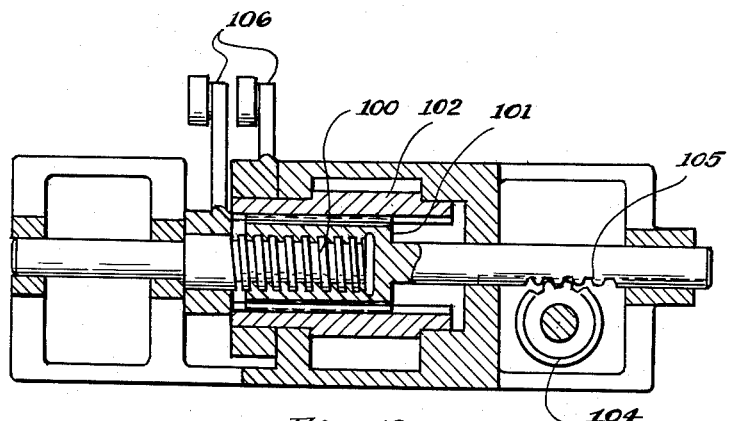
Fig. 12
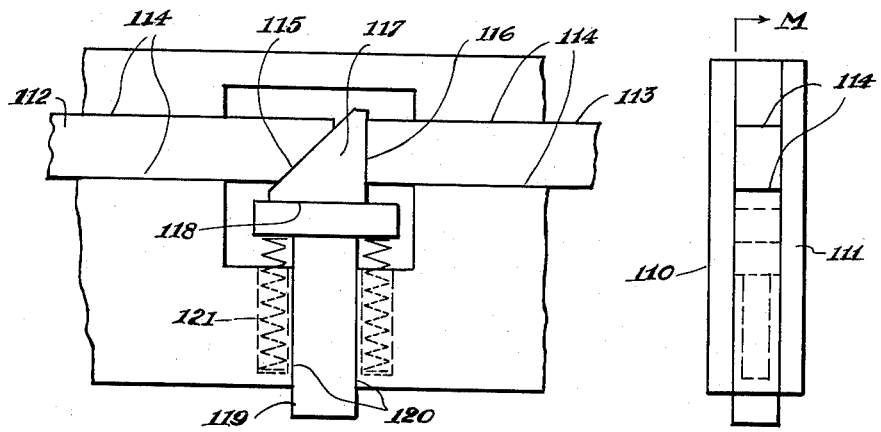
Section M-M
Fig. 13a
Fig. 13b
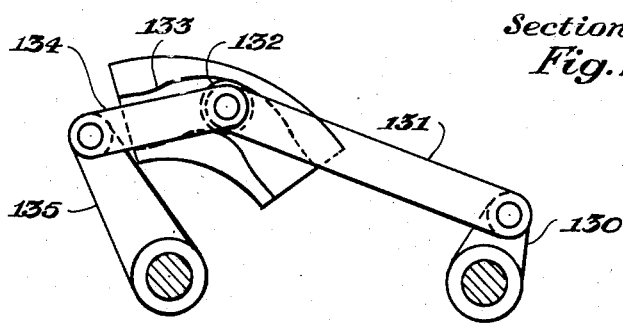
Fig. 14
Inventor
Erwin P. Pollitt

United States Patent Office 2,978,918
Patented Apr. 11, 1961

2,978,918
TRANSMISSION
Erwin P. Pollitt, 7515 S. Essex Ave., Chicago 49, Ill.
Filed July 25, 1958, Ser. No. 750,929
17 Claims. (Cl. 74—124)

The invention relates to a transmission.

The objective of the invention is to provide a transmission which is positive and yields a uniform output speed from a uniform input speed; the magnitude of this output speed can be varied by infinitesimal increments, and is virtually independent of the magnitude of the output torque.

The transmission is based on the following principle:

Uniform input motion is converted into a number of primary cyclic motions of equal velocity characteristics having periods of constant acceleration which are phase shifted with respect to one another by equal angles in fixed relationship, and an equal number of secondary cyclic motions of the same frequency as the primary motions having the same velocity characteristics as the primary motions and equal periods of constant acceleration of the same magnitude as that of the primary motions, said secondary motions being phase shifted with respect to one another in the same fixed relationship as the primary motions. Each secondary motion is correlated to a primary motion in such a manner that their periods of constant acceleration coincide during a portion of each cycle. The difference in speed of such correlated primary and secondary motions, during their common periods of constant acceleration must then be a uniform speed. The uniform speed difference obtained from each pair of correlated primary and secondary motions is transmitted to the output shaft. The magnitude of this speed difference can be varied by varying the phase between the primary motions and the secondary motions. Consequently a transmission based on this principle consists of means for generating primary and secondary motions having the aforesaid characteristics, means for obtaining the speed difference between correlated primary and secondary motions, and means for transmitting only the uniform speed difference to a common output shaft. In order to vary the output speed means must be added for varying the phase between the primary and secondary motions; if the transmission is used only as a speed reducer such latter means are not necessary.

The primary and secondary motions may be pure oscillations, or they may be motions which are combinations of uniform speed motions and superposed oscillatory motions.

The pattern of the positive accelerations of these motions may be the same as that of the negative accelerations.

Purely oscillatory motions with a prescribed velocity pattern may be obtained by rotating cams and co-acting followers, or by combination of cranks, linkages, and stationary cams. Motions which are a combination of motions with uniform speed and oscillatory motions with a prescribed velocity pattern may be obtained by non-circular gears or by variable pitch gears.

An adjustable phase angle between the primary and the secondary motions can be obtained by two helical toothed members where one of these members is driven by an input shaft producing the primary motions, while the other member drives a shaft producing the secondary motions, these members being so arranged that their relative endwise position is adjustable. Other means for varying the phase angle between two shafts are epicyclic gear trains or linkages.

The difference in speed between correlated, primary and secondary motions can be obtained by epicyclic gear trains, linkages or various other means.

Preferably the velocity pattern of the primary and the secondary motions is so chosen that the difference between their velocities has its maximum value during their common periods of constant acceleration; in this case overrunning clutches can be used for transmitting this speed difference to the output shaft.

A compact design of the transmission is possible if the input shafts on which the cams—or other elements—for generating the primary and the secondary motions are mounted, are arranged coaxially, and if the members coacting with these elements are carried on a number of intermediate shafts positioned at equal distances from the first mentioned shafts spaced at angles equal to the phase angle between individual primary and secondary motions. This arrangement permits all primary and secondary motions to be generated, in proper phase relationship by two single cams or equivalent elements; it also permits the output shaft to be in line with the input shaft.

Motion diagrams and various designs of the variable speed transmission are shown on the accompanying drawings.

Figs. 1–a to 1–f show velocity and acceleration diagrams of one pair of associated primary and secondary purely oscillatory motions on which the transmission in accordance with the invention is based.

Figs. 2–a to 2–d show velocity diagrams of four associated pairs of primary and secondary motions, in their proper phase relationship, of the type of Fig. 1, on which one possible design of the transmission is based.

Figs. 3–a and 3–b show velocity diagrams of two pairs of associated primary and secondary oscillatory motions of the type of Fig. 1 on which another possible design of the transmission is based.

Figures 4–a to 4–c show velocity diagrams of three pairs of associated primary and secondary oscillatory motions of the type of Fig. 1 on which another design of the transmission may be based.

Figures 5–a and 5–b show velocity diagrams of two pairs of associated primary and secondary oscillatory motions which also may be used as the basis of the design of the transmission.

Figures 8–a to 8–h show the design of variable speed transmission based on the diagrams of Fig. 2–a to 2–d;

Figure 8–a is a longitudinal section through the transmission taken along the line A—A (Figure 8–b);

Figure 8–b is a cross section taken along the line B—B (Figure 8–a);

Figure 8–c is a partial section taken along the line C—C (Figure 8–b);

Figure 8–d is a partial cross section taken along the line D—D (Figure 8–a);

Figure 8–e is a cross section taken along the line E—E (Figure 8–a);

Figure 8–*f* is a cross section taken along the line F—F (Figure 8–*a*);

Figure 8–*g* is a partial cross section taken along the line G—G (Figure 8–*b*);

Figure 8–*h* is a diagram of an epicylic gear train used in this design.

Figure 1A:
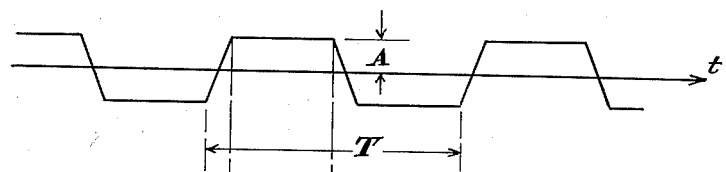
Figure 1B:
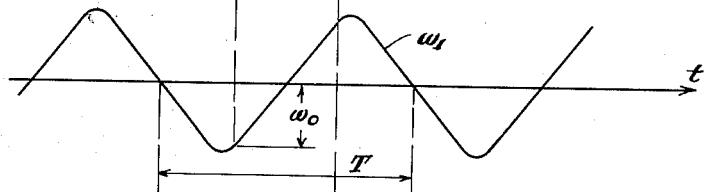
Figure 1C:
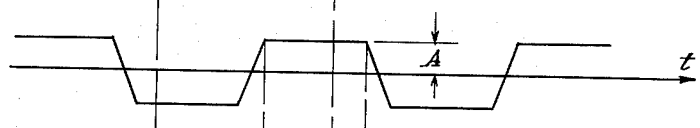
Figure 1D:
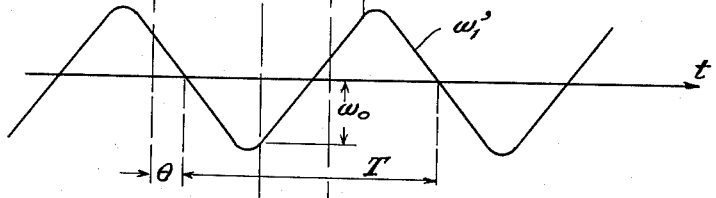
Figure 1E:
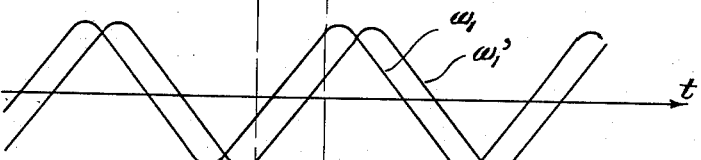
Figure 1F:
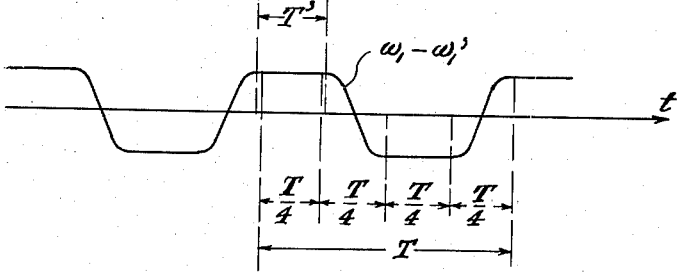
Figure 2A:
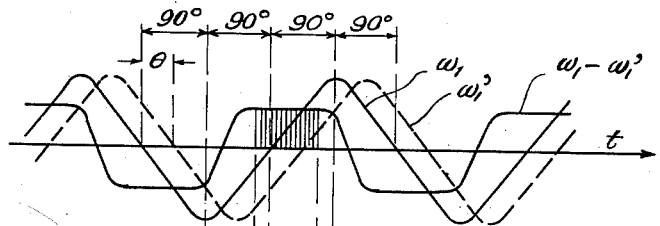
Figure 2B:
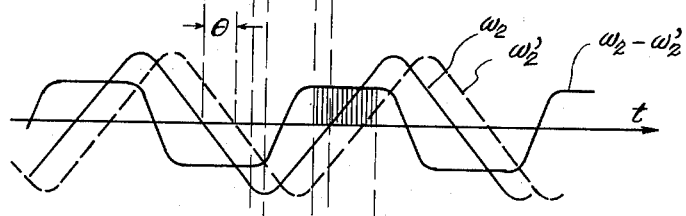
Figure 2C:
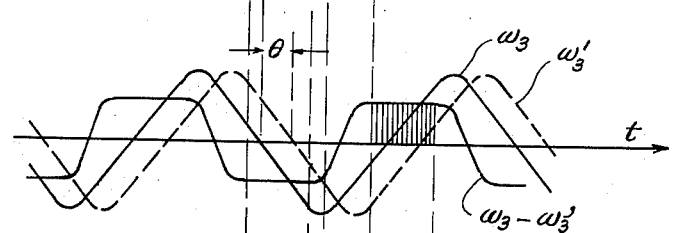
Figure 2D:
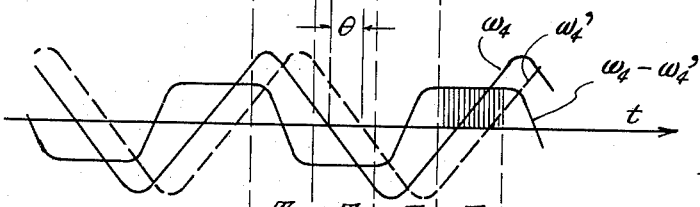
Figure 3A:
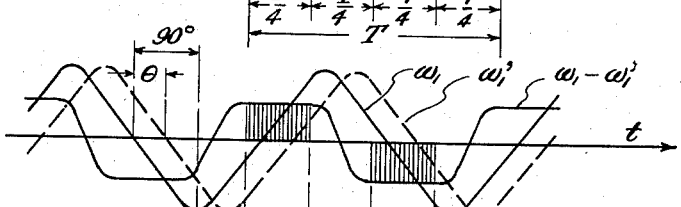
Figure 3B:
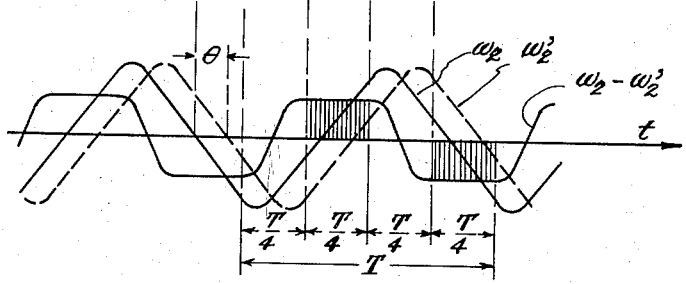

Figure 9–*a* to 9–*c* shows the design of a variable speed transmission based on the diagrams of Fig. 3–*a* to 3–*d*;

Figure 9–*a* corresponds to Figure 8–*b*, showing the end view of the epicyclic gear trains;

Figure 9–*b* corresponds to Figure 8–*g*, showing a cross section C'—C' (Figure 9–*a*);

Figure 9–*c* corresponds to Figure 8–*f*, showing the end view of the gear train between the overrunning clutches and the output shaft.

Figure 6:
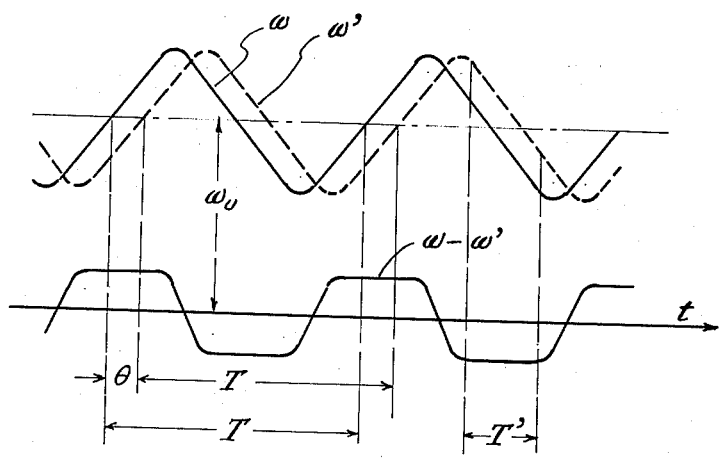
Fig. 6 shows the velocity diagrams of one pair of associated primary and secondary motions both of which are combinations of uniform speed motions and superposed oscillatory motions.
Figures 10D, 10E:
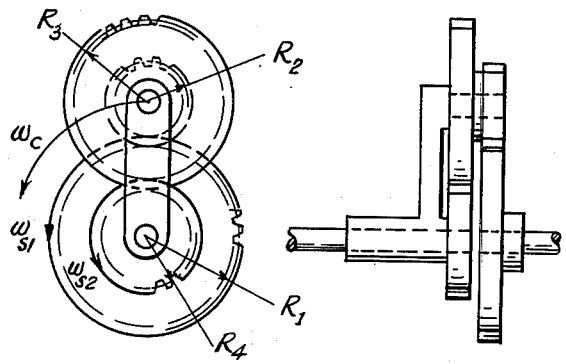
Figure 10B:
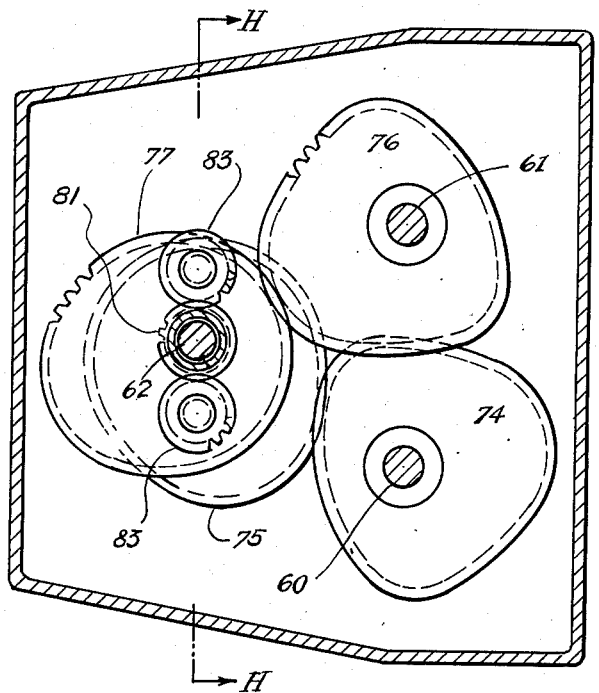
Figure 10C:
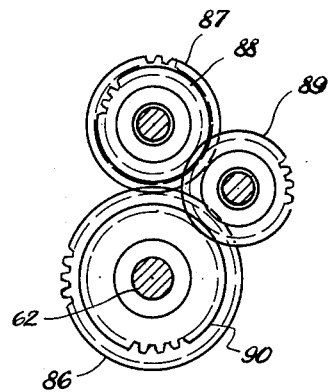

Figure 10–*a* to 10–*c* show in diagrammatic form a variable speed transmission based on the diagrams of Figure 6;

Figure 10–*a* is a longitudinal section taken along the line H—H (Figure 10–*b*);

Figure 10–*b* is a cross section taken along the line I—I (Figure 10–*a*);

Figure 10–*c* is a partial cross section taken along the line J—J (Figure 10–*a*);

Figure 10–*d* and 10–*e* are diagrams of the epicyclic gear train used in this design.

Figures 8G, 11A, 11B:
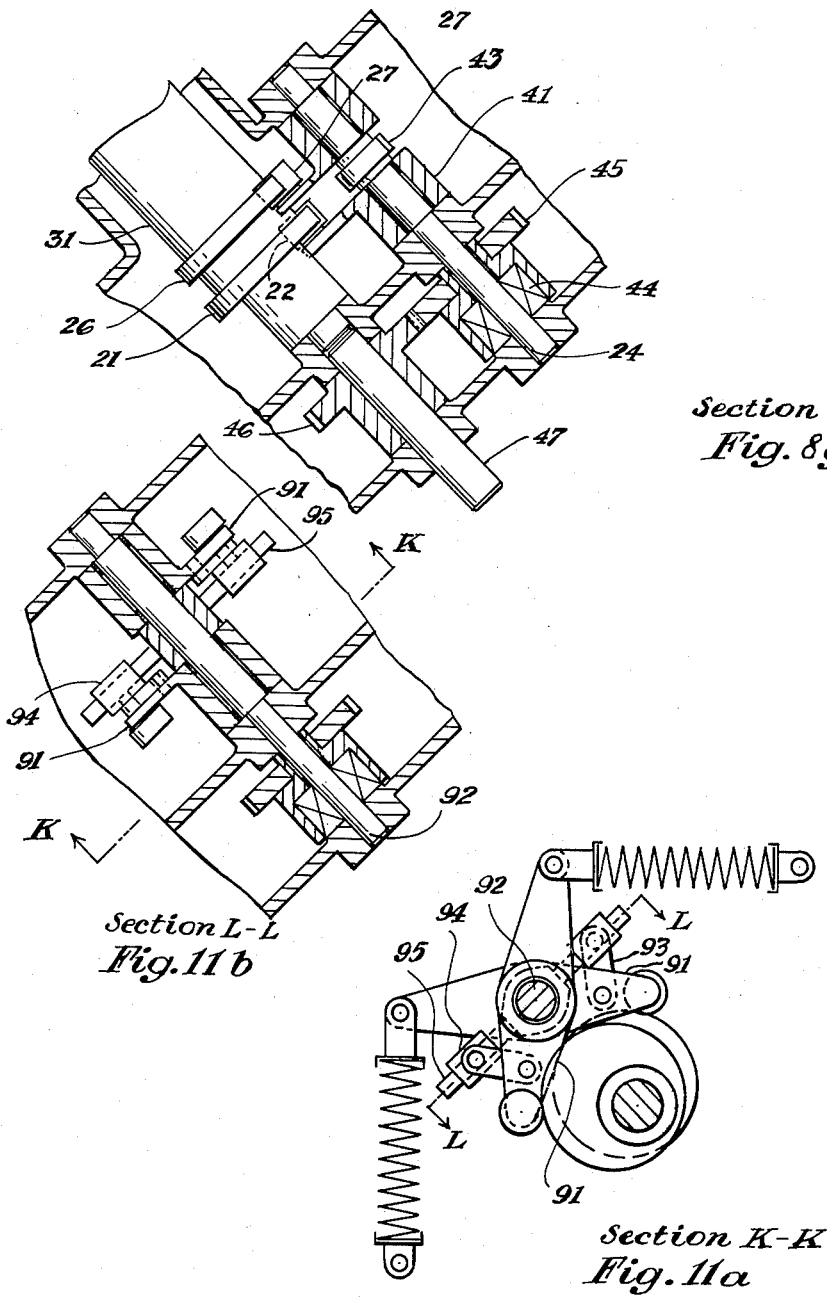

Figures 11–*a* and 11–*b* show the diagram of a linkage arrangement adaptable to the design of Fig. 8–*a* to 8–*h*, whereby the speed difference between oscillatory motions can be obtained;

Figure 11–*a* is a partial cross section taken along the line K—K (Figure 11–*b*);

Figure 11–*b* is a partial section taken along the line L—L (Figure 11–*a*).

Figure 12 shows the diagram of a differential screw arrangement whereby the speed difference between oscillatory motions can be obtained.

Figures 13–*a* and 13–*b* show an arrangement of wedge shaped blocks by which the speed difference between oscillatory motions can be obtained;

Figure 13–*a* is a partial section taken along the line M—M (Figure 13–*b*).

Figure 13–*b* is a partial section taken along the line N—N (Figure 13–*a*).

Figure 14 shows a diagram of a combination of links and a stationary cam for generating oscillatory motions with a prescribed velocity pattern.

The principle underlying the transmission will be best understood by the diagrams of Fig. 1–*a* to 1–*f*.

The primary oscillatory motion generated by the input motion is characterized by having during one cycle of time T a period of constant acceleration, one of constant deceleration of equal absolute magnitude, and two periods where the acceleration changes, as shown in Fig. 1–*a*. The absolute magnitude of the acceleration during the periods of changing acceleration is smaller than that of the constant accelerations. The resulting velocity pattern is shown in Fig. 1–*b*. The correlated secondary motion has equal frequency, and the same acceleration and velocity patterns as the primary motion, but is phase shifted with respect to the associated primary motion by an angle $\theta$, as shown in Fig. 1–*c* and 1–*d* respectively. Figure 1–*e* shows the two velocity diagrams superposed upon one another, and Fig. 1–*f* shows the diagram of the difference of these velocities.

The speed of the primary motion, during its constant acceleration period, $$\omega_1 = \omega_0 + At$$

The speed of the correlated secondary motion, during its constant acceleration period, $$\omega_1' = \omega_0 + A(t-\theta)$$

where $\omega_0$—the speed at the beginning of the uniform acceleration period;

A—the uniform acceleration;
$\theta$—the phase difference;
$t$—the time.

The speed difference during those periods T' where simultaneously both motions are uniformly accelerated (Fig. 1–*e* and 1–*f*)

$$\omega_1 - \omega_1' = \omega_0 + At - [\omega_0 + A(t-\theta)]$$

$$\omega_1 - \omega_1' = A\theta$$

This speed difference is dependent only on the magnitude of the constant acceleration and that of the phase difference. On account of the chosen velocity pattern the speed difference of the primary and associated secondary motion has a smaller value during other portions of the cycle.

By varying the phase $\theta$ the speed difference can be varied from its maximum value to zero; in the latter case the velocity diagram of the secondary motion coincides with that of the correlated primary motions.

Since a uniform speed difference can be obtained only during portions of the cycle it is necessary to generate a number of pairs of correlated primary and secondary motions.

The number of pairs of correlated motions necessary for obtaining uniform speed during a whole cycle depends on the acceleration and velocity pattern chosen; if these patterns are such that the periods of uniform speed difference extend only through one quarter of a cycle four such periods must be provided by these motions.

Figure 2–*a* and 2–*d* show the pattern of the velocities $\omega_1, \omega_1' \ldots \omega_4, \omega_4'$, and the pattern of the speed differences, of four pairs of correlated primary and secondary motions, each phased 90° apart from one another. These motions yield uniform positive speed differences during periods which, at the extreme phase angle, extend through a quarter of a cycle. The periods of uniform positive speed differences are indicated by the shaded areas of the diagrams.

Since the decelerations of the primary and secondary motions have the same pattern as their acceleration it is also possible to utilize the deceleration periods for obtaining uniform output motion; however, the direction of the output motion is opposite to that obtained during the acceleration periods.

Figures 3–*a* and 3–*b* show that only two pairs of primary and secondary motions, $\omega_1, \omega_1', \omega_2, \omega_2'$, of this type are needed for obtaining uniform output motion during the whole cycle. During those periods where the decelerations of the primary and secondary motions are uniform simultaneously, their speed difference is uniform, has the same absolute value at the speed difference of these motions during their periods of simultaneous uniform acceleration, but has the opposite sign; therefore, it is only necessary to make provisions for reversing this speed difference during the corresponding periods.

It is possible to obtain constant positive speed differences during a whole cycle by less than four pairs of correlated primary and secondary motions. This can be accomplished by making the decelerations of these motions larger than their accelerations.

Figure 4A:
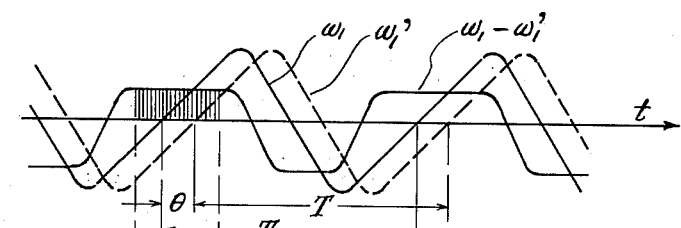
Figure 4B:
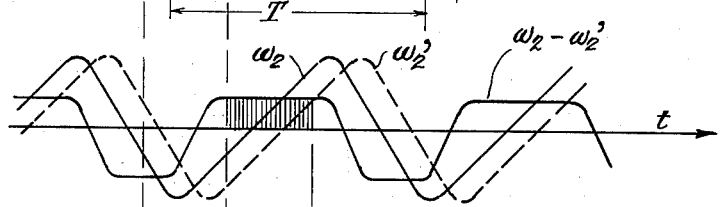
Figure 4C:
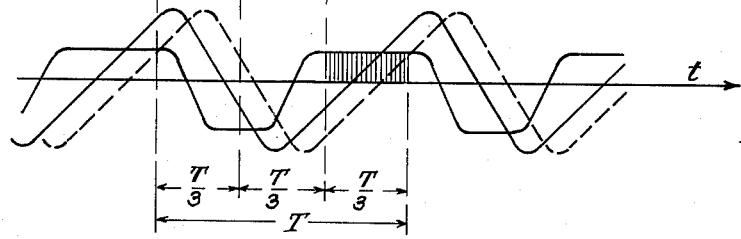

Figures 4–*a* to 4–*c* show the diagrams of the velocities, and velocity differences, of three pairs of correlated primary and secondary oscillatory motions of this kind, respectively. Positive uniform speed differences of each pair of these motions are obtained during one third of a cycle. These periods are indicated by shading. However, the maximum speed difference which can be obtained in this case is smaller than that which can be obtained from four pairs of associated motions having the same speed $\omega_0$ at the beginning of the constant acceleration period.

Figure 5A:
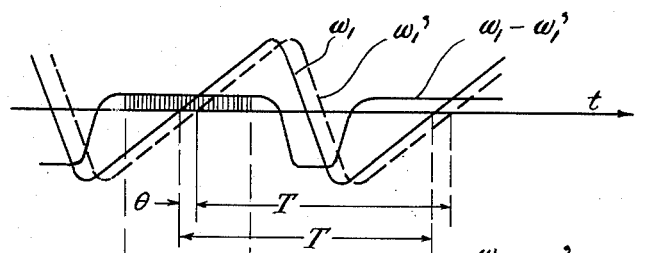
Figure 5B:
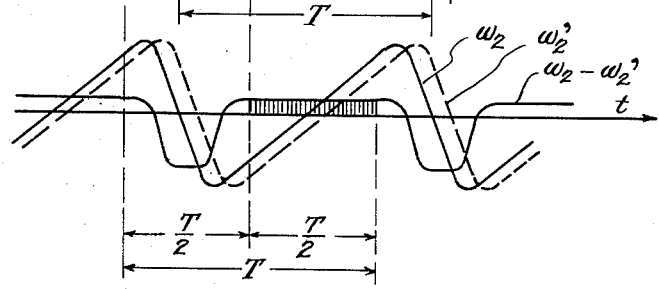

Figures 5–*a* and 5–*b* show corresponding diagrams of two pairs of associated motions respectively, which yield positive uniform speed differences during one-half of the cycle. The maximum speed difference which can be obtained in this case is smaller yet than in the previous case if the speed $\omega_0$ is again the same.

Figure 6 shows the velocity diagrams of one pair of primary and secondary motions consisting of motions with uniform speed $\omega_u$ with superposed oscillatory motions which can be used for obtaining uniform speed differences during one cycle. The characteristics of the superposed oscillatory motions are the same as those of the purely oscillatory motions of Figs. 3–a and 3–b. The diagram, Fig. 6, indicates that the speed differences of these compound motions are independent from the magnitude of the uniform motion over which the oscillatory motions are superposed. The same conclusion could be reached from the equation for the speed difference, since the constant speed terms $\omega_0$ would cancel out.

Uniform output speed of the transmission can also be obtained if only the primary motions are combinations of a uniform velocity motion and a superposed oscillatory motion while the related secondary motions are purely oscillatory motions, provided that both these oscillatory motions have the same acceleration and velocity characteristics as the oscillatory motions shown in one of the preceding figures.

Figure 7:
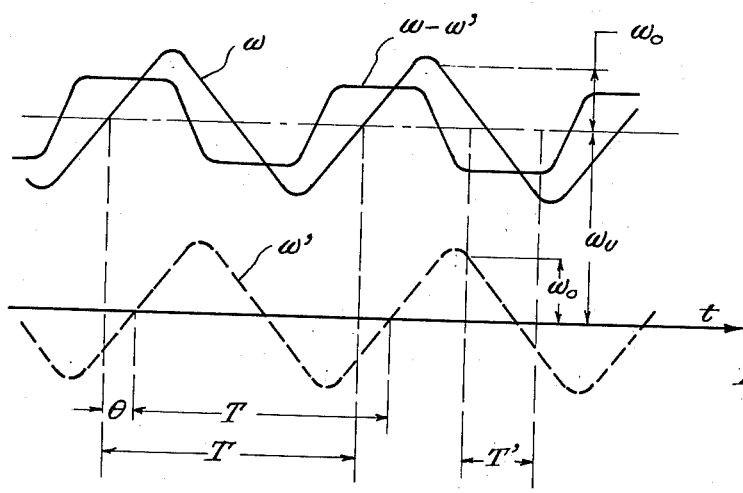
Fig. 7 shows the velocity diagrams of a primary motion consisting of a combination of a uniform speed motion and a superposed oscillatory motion, and that of an associated secondary motion which is a purely oscillatory motion; associated motions of this type may also be used as a basis for the design of the transmission.
Figure 8F:
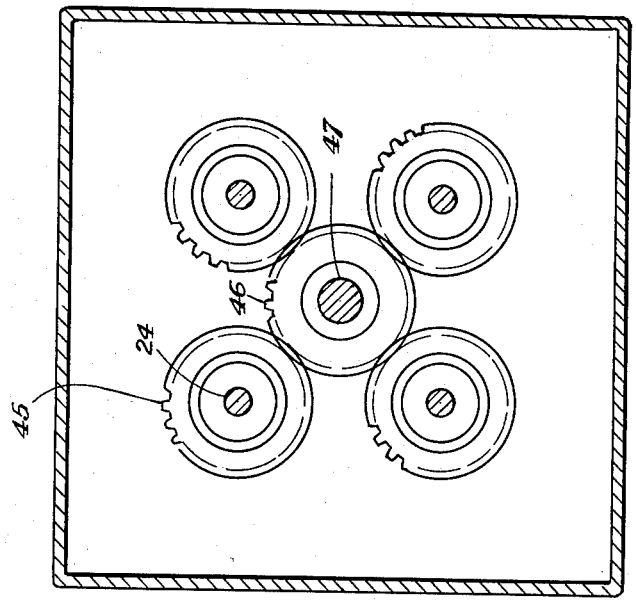
Figure 8E:
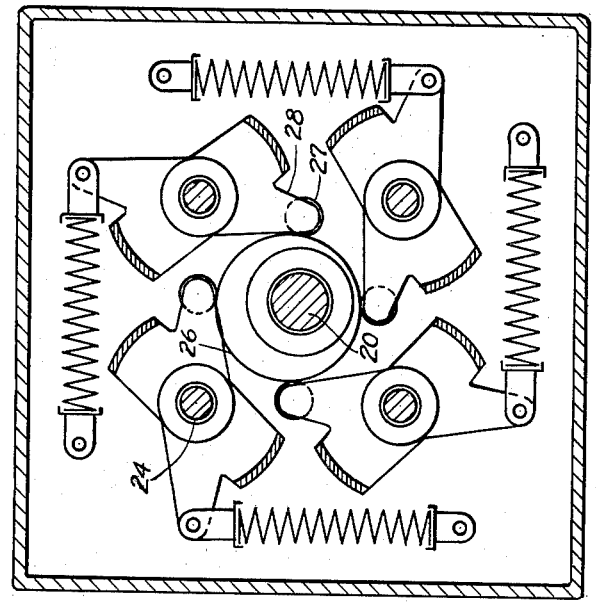
Figure 8H:
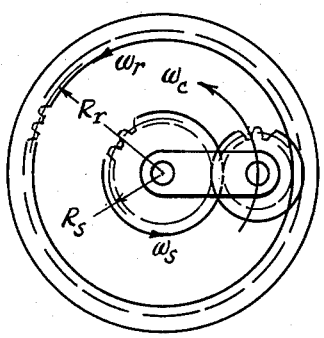

As shown in Fig. 7 the primary motion, during a period of constant deceleration, has a velocity $$\omega = \omega_u + \omega_0 - At$$

where $\omega_u$ is the velocity of the uniform motion component of the primary motion, $\omega_0$ the velocity of the superposed oscillatory motion component of the primary motion at the beginning of the constant acceleration period, $A$ the acceleration of the latter, and $t$ the time. The velocity of the correlated secondary motion, during its period of constant deceleration, $$\omega' = \omega_0 - A(t-\theta)$$

where $\theta$ denotes the phase angle, as previously. The difference between these velocities during periods $T'$ where the accelerations of both these motions are constant simultaneously, $$\omega - \omega' = \omega_u - A\theta$$

This is a uniform speed whose magnitude depends only on the uniform speed component of the primary motion, the acceleration of the oscillatory motions, and the phase angle. The extreme value of the speed difference, for $\theta=0$, is equal to the uniform speed component of the primary motion.

In the variable speed transmission shown in Figs. 8–a to 8–h two coaxial input shafts are provided. Cams and followers are used for generating four pairs of purely oscillatory primary and secondary motions. Epicyclic gear trains with ring gears are used for obtaining the speed differences between primary and secondary motions.

The central primary input shaft 20 has attached to it the primary cam 21 engaged by four spring loaded primary cam followers 22 mounted on arms 23 of equal length which are freely rotatable on intermediate shafts 24. These shafts are positioned at equal distance from shaft 20 and are spaced 90 degrees apart. The secondary input shaft 25 is coaxial with, and mounted rotatably on shaft 20. Shaft 25 is integral with the hub of the secondary cam 26. This cam is engaged by four spring loaded secondary cam followers 27 mounted on arms 28 of equal length which are also free to rotate on the intermediate shafts 24. The shaft 25 which is prevented from endwise motions by the hub of cam 21 and a shoulder 29 on shaft 20 is driven from the input shaft 20 by a spline coupling 30 which has internal helical splines engaging external helical splines on shaft 20, and external splines engaging internal splines provided in the hollow extention 31 of shaft 25. The latter splines may also be helical. The spline coupling is provided with a circular groove 32 engaged by shoes 33 pivoted on a forked shifter lever 34. This latter carries a worm gear segment 35 engaged by worm 36; rotation of the worm by handwheel 37 or the like will cause endwise motion of the spline coupling and relative rotation of the cams 21 and 26, which will change the phase between primary and secondary motions.

The intermediate shafts 24 carry the epicyclic gear trains by which the speed differences between the primary and secondary motions are obtained, and the overrunning clutches.

Each epicyclic gear train consists of two ring gear segments 40, a planet carrier 41 with two planet gears 42, and a sungear 43. The ring gear segments and the planet carrier are the input members of the gear train, the sun gear is its output member whose speed is proportional to the difference in speed between the input members.

The ring gear segments 40 are attached to the cam follower arms 27 while the cam follower arms 23 are integral with the planet carriers 41. The sun gears 43 are integral with the intermediate shafts 24. To these shafts are attached the input members of overrunning clutches 44 whose output members are attached to gears 45 engaging a central gear 46 on the output shaft 47 which is in line with the input shaft 20. The design details of the overrunning clutches are not shown since they are well known in the art; any type of design of these elements is applicable to the transmission.

The profile of the cams 21 and 26 is determined by the velocity pattern of the primary and secondary motions and by the proportions of the epicyclic gearing.

In an epicyclic spur gear train with a ring gear (Figure 8–h) the speed of the sungear, when the ring gear is locked and the planet carrier is driving, $$\omega_s = \omega_c\left(1 + \frac{R_r}{R_s}\right)$$

where $\omega_c$ is the speed of the planet carrier, and $R_r$, $R_s$, are the radii of the ring gear and the sun gear pitch circles, respectively. When the planet carrier is locked, and the ring gear is driving, the speed of the sun gear $$\omega_s' = -\omega_r\frac{R_r}{R_s}$$

where $\omega_r$ is the speed of the ring gear. The speed of the sun gear, when both the planet carrier and the ring gear are driven, $$\bar{\omega}_s = \omega_s + \omega_s' = \omega_c\left(1 + \frac{R_r}{R_s}\right) - \omega_r\frac{R_r}{R_s}$$

By making $\omega_s = \omega_1$, $\omega_2 \ldots$, $\omega_s' = \omega_1'$, $\omega_2' \ldots$ the velocity of the output motions $\omega_s = (\omega_1 - \omega_1')$, $(\omega_2 - \omega_2')$, are obtained.

During the periods of constant acceleration $$\bar{\omega}_s = A\theta$$

$$\omega_1' = \omega_0 + A(t-\theta) = \omega_r\frac{R_r}{R_s}$$

The velocity of the planet carrier $$\omega_c = \frac{R_s}{R_r + R_s}(\omega_0 + At)$$

The velocity of the ring gear $$\omega_r = \frac{R_s}{R_r}[\omega_0 + A(t-\theta)]$$

These equations indicate that the motions of the cam follower arms must be proportional to the primary and secondary motions. The proportionality factor can be calculated from the parameters of the gear train. The equations also indicate that, with this type of epicyclic gear train the magnitude of velocity and acceleration of the follower arms can be much smaller than velocity and acceleration of the primary and secondary motion.

The operation of the transmission is as follows:

The cams which are driven by the input shafts at equal speeds will cause the follower arms to perform purely oscillatory motions of equal frequency; the magnitude of this frequency is equal to the number of revolutions of the cams. Since all follower arms have equal length and since the intermediate shafts on which they are pivoted are positioned at equal distances from the cams the patterns of the motion of the follower arms will be identical. Since the intermediate shafts are spaced 90 degrees apart the motion of the folower arms will have the same phase difference. The follower arms 24 and the ring gear segments will perform oscillatory motions about the intermediate shafts which are proportional to the primary motions, while the follower arms 23 and the plant carriers will perform oscillatory motions about these shafts which are proportional to the secondary motions. The sun gears 43 and the shafts 24 proper will perform oscillatory motions equal to the difference in speed between correlated primary and secondary motions in acordance with the diagram, Fig. 1–f, and so will the input members of the overrunning clutches 44. During those portions of a cycle when the speed of the sun gears is uniform and equal to the speed of the output members of the overrunning clutches the latter will grab and transmit power, through gear 45, to the output shaft. During the remaining portions of the cycle when the speed of the sun gear is non-uniform or negative the overrunning clutches will slip, and no power will be transmitted through this train of drive elements. With the shown arrangement of four epicyclic gear trains and associated drive members, one set of these elements will transmit power during one quarter of a cycle; during the following quarter cycle the set of elements which is positioned at 90 degrees from the first, will become active, and so on, so that the output shaft will be continuously driven at uniform speed. The gears 45 and the output members of the overrunning clutches will also rotate uniformly during the whole cycle though they will transmit power only intermittently.

The magnitude of the output speed is varied by turning the worm 36 which will cause changes of the phase angle between primary and secondary motions as previously described.

Many variations of the design of the transmission are possible.

The number of cam followers and associated epicyclic gear trains can be reduced if the periods of constant deceleration occurring during the return motion of the followers is utilized for generating the output motion, as indicated by th diagrams of Figs. 3–a and 3–b.

The design of the transmission based on these diagrams can be similar to that of Fig. 8–a to 8–h, except that only two sets of cam followers, and two epicyclic gear trains are necessary. However, additional overrunning clutches and reversing gear trains at the output end must be provided. A transmission designed along these lines is shown in Fig. 9–a to 9–c.

Only those parts of the transmission which differ from the design of Fig. 8–a to 8–h are shown. Components identical to those used in the transmission of Fig. 8–a to 8–h are designated by identical numerals. The intermediate shafts 24 carry, besides the overrunning clutches 44, other clutches 48 which overun in the opposite direction than the clutches 44. The output members of these clutches drive, through reversing gears 49 and 50, a second central gear 51 on the output shaft 47.

The design of Fig. 8–a to 8–h can be changed in such a way that each of the four intermediate shafts 24 is provided with pairs of overrunning clutches which grab in opposite directions and is connected to the output shaft through two gear trains, one of them reversing the negative speed difference in a similar manner as do the clutches 48 and gears 49, 50 and 51 in the design of Fig. 9–a to 9–c. By such an arrangement the power capacity of the clutch of Fig. 8–a to 8–h can be doubled.

When inertia forces of the oscillating components are large it may be convenient to use pairs of conjugate cams or box cams instead of single plate cams, and double followers instead of spring loaded cam followers.

Another possible design of the transmission which is based on the velocity diagrams of Fig. 6 is shown in Fig. 10–a to 10–e. In this case the primary and secondary motions are combinations of motions with uniform speed with superposed oscillatory motions. These motions are obtained by non-circular gears. Two pairs of primary and secondary motions are generated; two sets of overrunning clutches and of reversing gears are provided in order to utilize both the positive and negative speed difference between primary and secondary motions for obtaining uniform output speed during a whole cycle in a similar way as in the design of Fig. 9–a to 9–c. The epicyclic gear train shown in the design of this transmission is of the type which uses two sun gears.

In the shown design two input shafts 60, 61 are provided which carry the non-circular gears through which the primary and secondary motions are generated; these shafts are arranged not coaxially but parallel to one another. All elements performing the primary and secondary motions are arranged coaxially on the output shaft 62.

The mechanism for adjusting the phase between primary and secondary motions consists of a pair of helical gears 65, 66. The primary shaft 60 has mounted on it the wide helical gears 65 in such a manner that the latter is prevented from endwise motion. The helical gear 65 is engaged by gear 66 having a splined hub which is mounted on the splined portion 67 of the secondary shaft 61 in such a manner that it is slidable endwise. The hub of gear 66 has a circular groove 69 engaged by shoes 68. These shoes are pivoted on a forked lever 70 whose position can be adjusted by worm gear segment 71, worm 72 and hand knob 73 or a similar control mechanism.

The primary shaft 60 has attached to it two non-circular primary gears 74 which have equally shaped pitch lines but are out of phase by 90 degrees. Gears 74 engage gears 75 which are free to rotate on the output shaft 62. The secondary shaft, 61, has attached to it two non-circular secondary gears 76 of similar shape as the gears 74; relative to one another these gears are also out of phase by 90 degrees and engage gears 77 which have similar shape as gears 75.

The epicyclic spur gear train by which the difference between primary and secondary motions is obtained consists of an input sun gear 78, a planet carrier 79 carrying two shafts 80 parallel to the output shaft 62; an output sun gear 81, and planet gears 82, 83, attached to the shafts 80. The input sun gear 78 engages the planet gears 82, while the output sun gear engages the planet gears 83. The sun gears 78, 81, and the planet carrier 79 are free to rotate on the output shaft 62.

The primary motions are imparted to the epicyclic gear train through the input sun gear 78 which is attached to the non-circular gear 75. The secondary motions are imparted to the epicyclic gear train through the planet carrier 79 which is integral with the non-circular gear 77. The sun gears 81 are connected to the outer members of overrunning clutches 84 whose inner members are keyed to the output shaft. The inner member of a second overrunning clutch, 85, which is arranged concentric to the first one and is overrunning in the opposite direction, is also connected to sun gear 81. The outer member of this clutch is connected to a gear 86 driving, through gears 87, 88, 89, a gear 90 on the output shaft.

The motions which must be imparted to the input members of the shown epicyclic gear train through the non-circular gear can be calculated as follows (see diagram, Fig. 9–d, 9–e):

Denoting by $R_1$, $R_2$, $R_3$, $R_4$, the radii of the first sun gear, first planet gear, second planet gear, and second sun gear respectively, the speed of the latter gear, if the planet carrier is locked and the first sun gear is driving, $$\omega_{s2} = \frac{R_1 R_3}{R_2 R_4}\omega_{s1}$$

where $\omega_{s1}$ is the speed of the first sun gear.

If the first sun gear is locked and the planet carrier is driving the gear train with speed $\omega_c$, the speed of the second sun gear $$\omega_{s2}' = \omega_c\left(1 - \frac{R_1 R_3}{R_2 R_4}\right)$$

The resulting speed of the second sun gear $$\bar{\omega}_{s2} = \omega_{s2} + \omega_{s2}' = \omega_{s1}\frac{R_1 R_3}{R_2 R_4} + \omega_c\left(1 - \frac{R_1 R_3}{R_2 R_4}\right)$$

$$\bar{\omega}_{s2} = \omega_c + (\omega_{s1} - \omega_c)\frac{R_1 R_3}{R_2 R_4}$$

If the ratio $$\frac{R_1 R_3}{R_2 R_4} = \frac{1}{2}$$

$$\bar{\omega}_{s2} = \frac{1}{2}(\omega_c + \omega_{s1})$$

Assuming, during the period of constant acceleration, $$\omega_{s1} = 2(\omega_0 - At)$$

and $$\omega_{s2} = A\theta$$

then the carrier speed, during the same period, $$\omega_c = -2[\omega_0 + A(t - \theta)]$$

From the above equations the proportions of the non-circular gears can be calculated.

The method of operation of this transmission is essentially the same as that of the transmission of Fig. 8–a to Fig. 8–h.

If the secondary motions are pure oscillations, as is necessary for producing the speed variations shown in Fig. 7, the non-circular gears 74 on shaft 60 may be replaced by cams, and the coacting gears 75 on the planet carrier by cam followers.

A means, other than epicyclic gear trains, for obtaining the difference in speed between oscillatory motions is the linkage shown in Fig. 11–a and 11–b.

Two spring loaded arms 91 which are free to rotate on shaft 92 are connected by links 93 to shoes 94 which are free to slide on two radial guide rods 95 attached to the shaft 92. Both links make the same angle with the arms 91 and the rods 95 respectively. If oscillatory motions are imparted to the arms, the shaft 92 will move at one half of the difference of the speed of the motions of these arms.

Another means for obtaining the difference between speeds of oscillatory motions is the differential screw shown in Fig. 12. The threaded shaft 100 engages the internal thread of the coaxial sleeve 101 which is provided with external straight splines are engaged by internal splines of a hollow shaft 102 co-axial to shaft 100 and sleeve 101. Rotations of shafts 100 and 102 will cause the sleeve to move endwise at a speed proportional to the difference of the angular speeds of these shafts. The endwise motions of the sleeve may be converted to a rotation by means of a gear 104 and a rack 105 attached to the sleeve 101.

The oscillatory input motions may be imparted to the shafts 100 and 102 by the cam follower arm 106.

Another means for obtaining the difference between speeds of oscillatory motions is the wedge arrangement shown in Fig. 13–a and 13–b.

The arrangement comprises four sliding blocks which are contrained to move between plates 110, 111 on top and bottom.

Two slides 112, 113 are constrained, by guide surfaces 114 to move parallel to one another. Slide 112 has an end surface 115 which is inclined at 45 degrees to the surfaces 114, while slide 113 has an end surface 116 which is perpendicular to the surfaces 114. Surfaces 115 and 116 engage parallel surfaces of a floating slide 117. Slide 117 has a surface 118 which is parallel to the surfaces 114 and engages a slide 119 guided between surfaces 120 which are perpendicular to the surfaces 114. Springs 121 or the like maintain contact between the engaging surfaces of the slides. Motions of the slides 112, 113, will cause the slide 119 to move at a velocity equal to the difference of the velocities of these slides, in a direction perpendicular to the direction of the motion of the slides 112, 113.

The same results are obtained if the slide 117 is replaced by a circular disc or a ball. The slides 119 can be connected with sprags which could transmit their motion to an output member. Application of this mechanism to the transmission would involve means for converting rotary motions into rectilinear motions, and vice versa.

The plates 110, 111 may be curved so as to form cylindrical guide surfaces such that the cylinder axis is parallel to the direction of motion of the slides 112, and 113. In this case the contacting surfaces 115, 116 would be helical; rectilinear motion could be imparted to the slides 112, 113 by means of drum cams.

The linkage and cam combination shown in Fig. 14 yields an oscillatory motion with a prescribed velocity pattern during a portion of a cycle. The driving crank 130 rotating at uniform input speed is connected by coupler 131 with the follower roller 132 guided in the stationary cam slot 133. The coupler is connected through link 134 with the driven crank 135. During the return stroke this crank will have different velocity and acceleration characteristics than during the forward stroke; therefore only the forward or the return stroke can be utilized for obtaining uniform output motion.

A transmission with a fixed ratio can be built similarly to the transmission of Fig. 8–a to Fig. 8–h; in this case the shafts 20, 25 can be one integral shaft, and the cam 26 can be rigidly attached to this shaft. The helical spline coupling and the associated phase adjusting mechanism can be omitted.

What I claim is:

1. A transmission comprising in combination: a system of input shafts, rotatable at equal speeds, an output shaft, a first set of mechanisms driven by an input shaft adapted to convert uniform input motion into a number of motions proportional to primary cyclic motions which have equal velocity characteristics, equal periods of constant acceleration, and are phase shifted with respect to one another by equal angles in a fixed relationship; a second set of mechanisms driven by an input shaft adapted to convert uniform input motion into the same number of motions proportional to secondary cyclic motions, having the same frequency, velocity, acceleration, and phase shift characteristics as the primary motions, each secondary motion being correlated to a primary motion in such a manner that their periods of equal constant acceleration partly coincide so that the speed differences between these motions, during said periods, are uniform and of equal magnitude, said periods of uniform speed difference between pairs of correlated primary and secondary motions following one another during each cycle and covering sufficiently large portions of a cycle so that uniform speed difference exists during the whole cycle; a third set of mechanisms having, in combination, a first input member driven by the first said set of mechanisms, a second input member driven by the second said set of mechanisms, an output member, and overrunning clutches adapted to transmit motions of said output member to the output shaft, said output member adapted to co-act with the said two input members in such a manner as to perform a motion which is proportional to the difference of the motions of said two input members, so as to have periods of constant speed during a portion of a cycle, the various output members of said third set of mechanisms successively imparting uniform motion pulses to the output shaft such that the output shaft is caused to rotate at uniform speed during the whole cycle.

2. Transmission in accordance with claim 1 wherein the said first and second set of mechanisms is adapted to convert uniform input motion into a primary and secondary cyclic motion, respectively, whose pattern of acceleration is essentially equal to their pattern of deceleration.

3. Transmission in accordance with claim 1 wherein the said first and second set of mechanisms is adapted to convert uniform input motion into primary and secondary cyclic motions which are pure oscillations.

4. Transmission in accordance with claim 1 wherein the said first and second set of mechanisms is adapted to convert uniform input motion into primary and secondary cyclic motions which are combinations of motions with uniform speed and superposed oscillatory motions.

5. Transmission in accordance with claim 1 having a first said set of mechanisms adapted to convert uniform input motion into motions proportional to the cyclic primary motions wherein said mechanisms comprise, in combination, a single element on an input shaft, and a number of output elements coacting with said single element, said output elements mounted on intermediate shafts, said intermediate shafts positioned at equal distance from the output shaft and spaced at angles equal to the phase angle between the primary motions, a second said set of mechanisms adapted to convert uniform input motion into motions proportional to the cyclic secondary motions wherein said mechanisms comprise, in combination, a single element on an input shaft arranged co-axial with said first input shaft, output elements co-acting with said single element, the number of said output elements being equal to the number of the corresponding output elements of the said first set of mechanisms, said output elements being mounted on the same intermediate shafts as the first said type of output elements associated with the correlated primary motion, the output elements of the said first type and the output elements of the said second type constituting the input members of the said third set of mechanisms by which motions proportional to the difference of the motion of two input members are obtained.

6. Transmission in accordance with claim 1, wherein each of the mechanisms adapted to convert uniform input motion into motions proportional to the cyclic primary motions, have, in combination, an element attached to the input shaft, an output element concentric to the output shaft, these mechanisms being phase shifted with respect to one another by angles equal to the phase angle between the individual primary motions, the number of these mechanisms being equal to the number of the primary motions, wherein each of the mechanisms adapted to convert uniform input motion into motions proportional to the cyclic secondary motions, have, in combination, an element attached to an input shaft parallel to the first said input shaft, an output element concentric to the output shaft, these mechanisms being phase shifted with respect to one another by the same phase angle as the first said set of mechanisms, their number being the same as the number of the first said set of mechanisms, the output elements of the first type, and the output elements of the second type constituting the input members of the third set of mechanisms by which motions proportional to the difference of two input motions are obtained.

7. Transmission in accordance with claim 1 wherein uniform input motions are converted into motions proportional to primary and secondary cyclic motions by means of cams driven by the input shafts, and co-acting cam followers.

8. Transmission in accordance with claim 1 wherein uniform input motions are converted into motions proportional to primary and secondary cyclic motions by means of cranks driven by the input shafts, in combination with coupler links, arms connected to said cranks by said coupler links and stationary cams controlling the motion of said coupler links in such a manner that the arms perform the motions proportional to the primary and secondary motions.

9. Transmission in accordance with claim 1 wherein uniform input motions are converted into motions proportional to primary and secondary cyclic motions by means of non-circular gears driven by the input shafts, engaging non-circular gears, the co-acting gears shaped in such a manner that the second said gears perform motions proportional to the primary and secondary motions.

10. Transmission in accordance with claim 1 wherein the mechanisms by which the motion difference between correlated primary and secondary motions are obtained consist of epicyclic gear trains.

11. Transmission in accordance with claim 1 wherein the mechanisms by which the motion difference between correlated primary and secondary motions are obtained consist of sets of linkages, each having, in combination, two input arms of equal length freely rotatable about a common output shaft, two radial rods attached to said output shaft, two shoes slidable mounted on said rods, and two links of equal length connecting said arms and shoes.

12. Transmission in accordance with claim 1 wherein the mechanism by which the motion difference between correlated primary and secondary motions is obtain consists of sets of co-axial members, each having, in combination, an externally threaded rotatable input member, an internally splined hollow rotatable second input member, and axially slidable hollow output member provided with internal threads engaging the externally threaded first input member, and provided with external splines engaging the internally splined hollow second input member, these members being arranged in such a way that the output member is adapted to perform an end-wise motion proportional to the difference of rotary motions of the input members.

13. Transmission in accordance with claim 1 wherein the mechanism by which the motion difference between correlated primary and secondary motions is obtained consists of sets of sliding blocks constrained to perform motions along a surface, each set having, in combination, two input blocks constrained to perform rectilinear motions parallel to one another proportional to correlated primary and secondary motions, an output block adapted to slide in a direction perpendicular to said input blocks, surfaces on said input blocks engaging surfaces on said output block in such a manner that the output block is adapted to perform motions in the direction perpendicular to the motion of the input blocks and proportional to the motion difference between correlated primary and secondary motions.

14. Transmission in accordance with claim 1, wherein said system of input shafts consists of a single primary input shaft driving the first said set of mechanisms adapted to generate motions proportional to the primary motions, and a single secondary input shaft driven by said primary input shaft driving the second said set of mechanisms adapted to generate motions proportional to the secondary motions, and a control mechanism adapted to change the phase between said primary and said secondary input shaft.

15. Transmission in accordance with claim 14, wherein said control mechanism comprises, in combination, a member provided with helical teeth driven by the said primary input shaft, a second member provided with helical teeth engaging the first said member and driving the said secondary input shaft, said toothed members arranged in such a way that they can be shifted end-wise with respect to one another such as to change the phasing between said two input shafts.

16. Transmission in accordance with claim 14, wherein said control mechanism comprises, in combination, helical splines provided on said primary input shaft, helical splines provided on said secondary input shaft arranged co-axial with said primary shaft, and a spline coupling arranged co-axial with both said primary and secondary shafts and provided with splines engaging both the splines of the said primary and secondary input shafts.

17. Transmission in accordance with claim 1 having two sets of overrunning clutches driven by the output members whose motion is equal to the motion difference of correlated primary and secondary motions, one set of overrunning clutches adapted to grab in one direction of rotation of said members, the other set adapted to grab in the opposite direction, the output members of both sets of overrunning clutches driving the output shaft, and a set of reversing mechanisms placed in the path of the power transmission between the output members of one set of overrunning clutches and the output shaft in such a manner that both sets of overrunning clutches transmit motion in the same direction to the output shaft.

References Cited in the file of this patent

UNITED STATES PATENTS

| | | |
|---|---|---|
| 1,840,871 | Rayburn | Jan. 12, 1932 |
| 2,665,590 | Weber | Jan. 12, 1954 |
| 2,672,062 | Marchi | Mar. 16, 1954 |